United States Patent
Hegde et al.

(10) Patent No.: US 12,445,967 B2
(45) Date of Patent: Oct. 14, 2025

(54) SYSTEM AND METHOD FOR REDUCING POWER CONSUMPTION

(71) Applicant: Microsoft Technology Licensing, LLC, Redmond, WA (US)

(72) Inventors: Uday S. Hegde, Issaqah, WA (US); Prateek Agrawal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/643,593

(22) Filed: Apr. 23, 2024

(65) Prior Publication Data

US 2024/0306092 A1    Sep. 12, 2024

Related U.S. Application Data

(63) Continuation of application No. 17/315,752, filed on May 10, 2021, now Pat. No. 11,979,835.

(51) Int. Cl.

| | |
|---|---|
| *H04W 52/02* | (2009.01) |
| *H04B 17/318* | (2015.01) |
| *H04W 4/90* | (2018.01) |
| *H04W 24/08* | (2009.01) |
| *H04W 76/30* | (2018.01) |
| *H04W 84/12* | (2009.01) |

(Continued)

(52) U.S. Cl.
CPC ...... *H04W 52/0245* (2013.01); *H04B 17/318* (2015.01); *H04W 52/0251* (2013.01); *H04W 76/30* (2018.02); *H04W 4/90* (2018.02); *H04W 84/12* (2013.01)

(58) Field of Classification Search
CPC ......... H04W 52/0209; H04W 52/0212; H04W 52/0245; H04W 52/0251; H04W 76/30; H04W 4/90; H04W 84/12; H04B 17/309; H04B 17/318
See application file for complete search history.

(56) References Cited

U.S. PATENT DOCUMENTS

| | | | |
|---|---|---|---|
| 8,588,728 B1 * | 11/2013 | Hassan | H04W 52/0261 455/343.1 |
| 9,838,978 B1 * | 12/2017 | Sung | H04W 52/262 |
| 10,582,399 B1 * | 3/2020 | Yoon | H04W 24/02 |

(Continued)

OTHER PUBLICATIONS

Communication pursuant to Article 94(3) Received in European Patent Application No. 22720175.3, mailed on Aug. 8, 2025, 08 pages.

*Primary Examiner* — Jenee Holland

(57) ABSTRACT

A method of reducing power consumption of a first wireless communication device is described. A charge level of a battery associated with the first wireless communication device is monitored. A wireless communication session between the first wireless communication device and a second wireless communication device is maintained. Based at least in part on the charge level of the battery being within a low battery threshold range, a wireless signal strength associated with the wireless communication session is monitored. Based at least in part on the wireless signal strength reaching a power saving threshold that is above a minimum connection threshold for maintaining the wireless communication session, a power saving action associated with a wireless interface that supports the wireless communication session is performed.

19 Claims, 8 Drawing Sheets

(51) Int. Cl.
    *H04W 88/06*     (2009.01)
    *H04W 92/18*     (2009.01)

(56) References Cited

U.S. PATENT DOCUMENTS

| | | | |
|---|---|---|---|
| 2008/0062948 A1* | 3/2008 | Ponnuswamy | H04W 72/30 |
| | | | 370/342 |
| 2011/0280239 A1* | 11/2011 | Tung | H04M 3/42246 |
| | | | 709/227 |
| 2011/0305159 A1* | 12/2011 | Hofmann | H04W 72/542 |
| | | | 370/252 |
| 2012/0188979 A1* | 7/2012 | Haddad | H04W 76/23 |
| | | | 370/331 |
| 2012/0214533 A1* | 8/2012 | Bakthavathsalu | H04W 4/80 |
| | | | 455/517 |
| 2013/0107783 A1* | 5/2013 | Shaw | H04W 4/06 |
| | | | 370/312 |
| 2015/0271870 A1* | 9/2015 | Agiwal | H04W 76/14 |
| | | | 370/311 |
| 2016/0073349 A1* | 3/2016 | Mohan | H04W 76/14 |
| | | | 455/552.1 |
| 2016/0295447 A1* | 10/2016 | Braun | H04B 7/0686 |
| 2016/0337957 A1* | 11/2016 | Gonsalves | H04L 43/16 |
| 2016/0381547 A1* | 12/2016 | Jain | H04W 8/02 |
| | | | 455/432.1 |
| 2017/0164165 A1* | 6/2017 | Negalaguli | H04W 12/033 |
| 2017/0311147 A1* | 10/2017 | Agiwal | H04W 8/005 |
| 2021/0227480 A1* | 7/2021 | Sridharan | H04L 5/0051 |

\* cited by examiner

SYSTEM AND METHOD FOR REDUCING POWER CONSUMPTION

CROSS-REFERENCE TO RELATED APPLICATIONS

This application is a continuation of U.S. patent application Ser. No. 17/315,752, filed on May 10, 2021, now U.S. Pat. No. 11,979,835, the disclosure of which is hereby incorporated by reference in its entirety.

BACKGROUND

Wireless communication devices, such as tablets, laptops, 2-in-1s, and mobile phones, run on batteries that have limited capacity. As usage and capabilities of these devices have increased, their increased power consumption may cause the batteries to reach low levels of charge, often within a single day. Wireless interfaces of the devices establish, maintain, and terminate wireless communication sessions and a wireless communication device may have several such interfaces, for example, one or more of a Wi-Fi interface, Bluetooth interface, cellular interface, etc. Each wireless interface may consume a substantial amount of power when actively communicating and even maintaining an idle communication session.

SUMMARY

Aspects of the present disclosure are directed to reducing electrical power consumption of a wireless communication device. More specifically, when battery levels of the wireless communication device reach various power thresholds, electrical power consumed to support wireless communication sessions may be reduced to extend an operational time of the device (i.e., a time until the wireless communication device shuts down due to lack of electrical power). Additionally, processing overhead related to wireless interfaces of the wireless communication device may be reduced to extend the operational time. In various embodiments, a wireless communication device may include a battery monitor and a wireless state controller. The battery monitor may monitor a charge level of a battery for the wireless communication device. The wireless state controller monitors wireless signal strengths, such as transmission power levels and/or received signal power levels, and performs one or more power saving actions, for example, terminating wireless communication sessions, disabling software features related to wireless communication sessions, reducing transmission power, and/or disabling hardware components that support wireless communication sessions. The wireless state controller automatically performs the power saving actions based on a current charge level of the battery, which saves a user of the wireless communication device from having to manually monitor the charge level, disable features if the charge level is low, and enable the features if the battery is recharged.

In accordance with some examples of the present disclosure, a method of reducing power consumption of a first wireless communication device is described. A charge level of a battery associated with the first wireless communication device is monitored. A wireless communication session between the first wireless communication device and a second wireless communication device is maintained. Based at least in part on the charge level of the battery being within a low battery threshold range, a wireless signal strength associated with the wireless communication session is monitored. Based at least in part on the wireless signal strength reaching a power saving threshold that is above a minimum connection threshold for maintaining the wireless communication session, a power saving action associated with a wireless interface that supports the wireless communication session is performed.

In accordance with some examples of the present disclosure, a method of reducing power consumption of a first wireless communication device is described. A charge level of a battery associated with the first wireless communication device is monitored. A wireless communication session between the first wireless communication device and a second wireless communication device is maintained by a radio stack of the first wireless communication device. Based at least in part on the charge level of the battery being within a low battery threshold range, a roaming functionality of the radio stack is disabled.

In accordance with some examples of the present disclosure, a first wireless communication device is described. The first wireless communication device includes a battery monitor configured to monitor a charge level of a battery associated with the first wireless communication device. The first wireless communication device also includes a wireless interface having a radio stack configured to establish, maintain, and terminate a wireless communication session with a second wireless communication device, and state controller configured to monitor a wireless signal strength associated with the wireless communication session based at least in part on the charge level of the battery being within a low battery threshold range. The wireless state controller is configured to cause the wireless interface to perform a power saving action associated with the wireless communication session based at least in part on i) the wireless signal strength reaching a power saving threshold that is above a minimum connection threshold for maintaining the wireless communication session, and ii) the charge level of the battery being within the low battery threshold range.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Wireless interfaces may take up a relatively large share of the power consumption of a wireless communication device. Although a user may wish to disable a wireless interface that is not in use, manually disabling and enabling a wireless interface may be inconvenient for a user to frequently perform. It is with respect to these and other general considerations that embodiments have been described. Also, although relatively specific problems have been discussed, it should be understood that the embodiments should not be limited to solving the specific problems identified in the background.

The present disclosure describes various examples of a wireless communication device configured to control the power consumed by a wireless interface. The techniques make adjustments to a current state of a wireless interface and/or transmission power levels used to generate wireless output signals based on a current charge level of the battery. For example, when a charge level of the battery reaches various thresholds, such as percentage levels of a maximum power that can be stored in the battery, the transmission power level may be stepped down to lower levels. As another example, various wireless features may be disabled or modified to reduce power consumption associated with a wireless interface.

Figure 1:
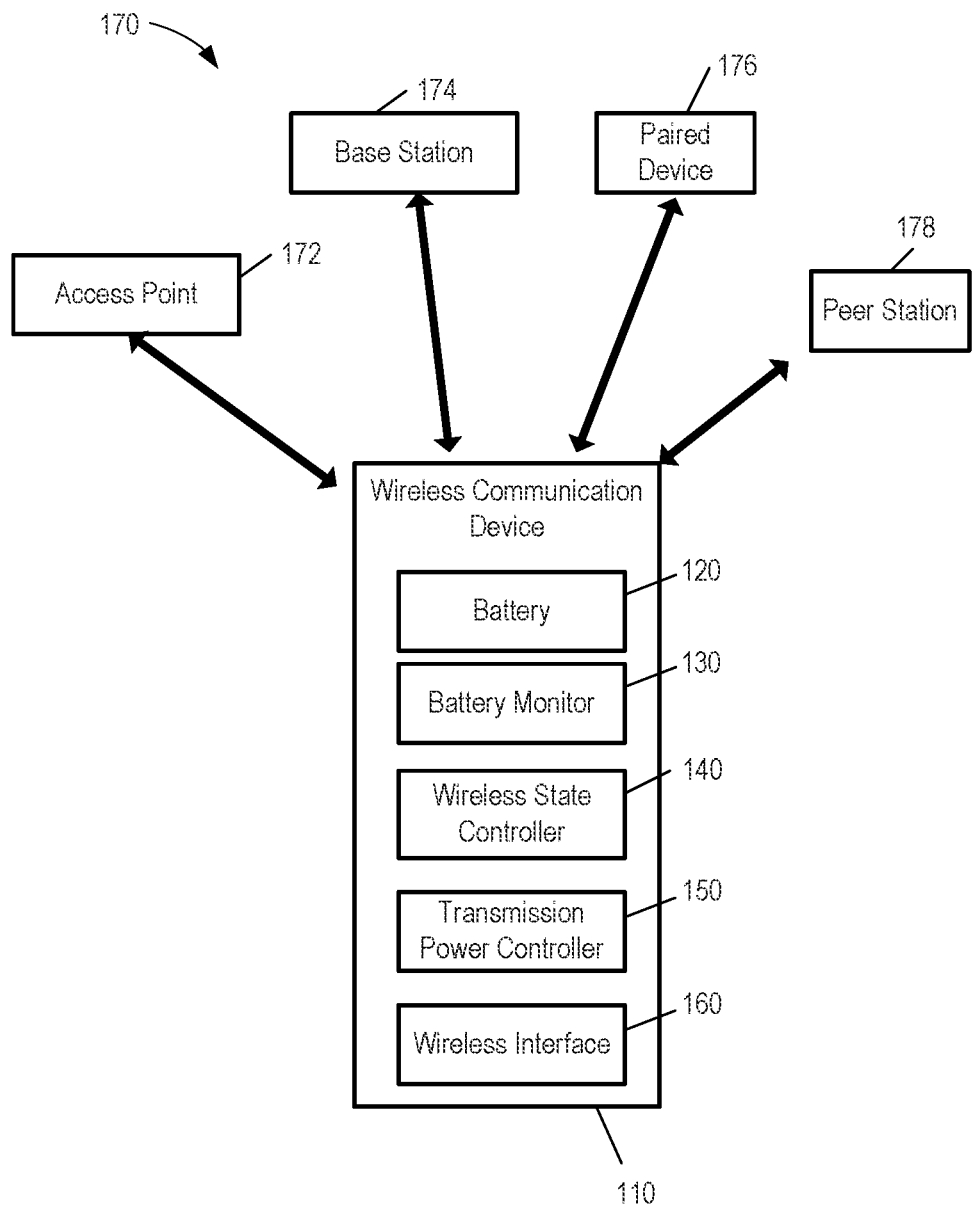
FIG. 1 shows a block diagram of an example of a wireless communication device in which a wireless state controller and a transmission power controller may be implemented, according to an example embodiment.

This and many further embodiments for a wireless communication device are described herein. For instance, FIG. 1 shows a block diagram of an example of a wireless communication device 110 in which a wireless state controller 140 and a transmission power controller 150 may be implemented, according to an example embodiment. Examples of the wireless communication device 110 include mobile phones (e.g., smartphones or feature phones), tablets, 2-in-1 computing devices, laptops, digital camera, or other suitable wireless communication devices. The wireless communication device 110 may establish wireless communication sessions with one or more other wireless communication devices 170, for example, a Wi-Fi access point 172, a 4G or 5G cellular base station 174, a paired device 176 (e.g., a Bluetooth device or mobile hotspot device), a peer station 178 (e.g., an ad-hoc Wi-Fi station or Wi-Fi Direct station), or other suitable wireless communication device.

In the embodiment shown in FIG. 1, the wireless communication device 110 includes a battery 120, a battery monitor 130, a wireless state controller 140, a transmission power controller 150, and a wireless interface 160. In other embodiments, one or more elements of the wireless communication device 110 may be omitted. In one such embodiment, the transmission power controller 150 is omitted. In another embodiment, at least some functionality of the battery monitor 130 is provided directly by the battery 120 and the battery monitor 130 is omitted from the wireless communication device 110.

The battery 120 provides electrical power to the wireless communication device 110 and may include a lithium ion battery, lithium polymer battery, nickel cadmium battery, nickel metal hydride battery, or other suitable battery. In some embodiments, the battery 120 is a single cell battery, such as a pouch or cylinder-shaped battery. In other embodiments, the battery 120 is a multi-cell battery having, for example, two or more 18650 cells, or other suitable cell arrangement. In some embodiments, the battery 120 also includes an integrated battery controller (not shown), for example, a protection circuit, configured to manage charging, discharging, and health of the battery 120. In one such embodiment, the battery controller provides information about a charge level of the battery 120, as described herein.

The battery monitor 130 is configured to monitor a charge level of the battery 120. In various embodiments, the battery monitor 130 includes a voltage sensor and/or current sensor to determine the charge level of the battery 120, for example, based on an initial voltage level, a current voltage level (e.g., after a period of operation), a discharge rate, an electrical current level, or other suitable characteristics of the battery 120. In some embodiments, the battery monitor 130 receives information about the charge level from the battery 120 itself (e.g., the battery controller). The battery monitor 130 may provide an estimate of the charge level as a percentage of a full charge (e.g., 100%, 75%), a power scale (e.g., 0.0 to 10.0), a charge capacity (e.g., 3200 milliamp hours), or other suitable indication of charge level. In various embodiments, the battery monitor 130 is implemented as an integrated circuit, a software module, or a combination of hardware and software components.

The wireless state controller 140 is configured to manage the wireless interface 160 and monitor a wireless signal strength associated with wireless communication sessions. In various embodiments and/or scenarios, the wireless state controller 140 receives the current charge level of the battery 120 and automatically reduces a transmission power, disables the wireless interface 160, enables the wireless interface 160, changes parameters of the wireless interface 160, and/or other suitable power saving actions based on the current charge level. In some embodiments, the wireless state controller 140 also uses prior usage of the battery 120 to determine when to perform a power saving action, for example, based on consistent heavy usage at a particular time of day or when in a particular location.

The transmission power controller 150 is configured to manage the wireless interface 160 and adjust a power level used to generate wireless output signals. For example, when the wireless interface 160 is supporting an active wireless communication session between the wireless communication device 110 and the Wi-Fi access point 172, the transmission power controller 150 may provide a signal, message, or other instruction to the wireless interface 160 that causes a radio stack, described below, to reduce a transmission power level (e.g., from 12 dB to 10 dB). As another example, the transmission power controller 150 may cause a Wi-Fi radio stack to reduce transmission processing by reducing a modulation and coding scheme (MCS) from MCS index 5 to MCS index 0, thereby reducing a complexity (and power consumption) of processing on signals for transmission. As yet another example, the transmission power controller 150 may cause the wireless interface 160 to disable one or more antennas, for example, to use only one antenna, instead of two or three antennas for multiple input multiple output (MIMO) communications (e.g., using a 1×1 antenna configuration instead of a 2×2 antenna configuration).

The wireless interface 160 is configured to establish, maintain, and terminate a wireless communication session with other wireless communication devices, such as the wireless communication devices 170. The wireless interface 160 may include a radio interface layer and/or antenna, such as a medium access control (MAC) layer and a physical (PHY) layer, described below. Although only a single wireless interface 160 is shown in FIG. 1, the wireless communication device 110 may include two, three, four, or more instances of the wireless interface 160. In an embodiment, for example, the wireless communication device 110 may include a Wi-Fi interface, a Bluetooth interface, a 4G cellular interface, and a 5G cellular interface.

Figure 2:
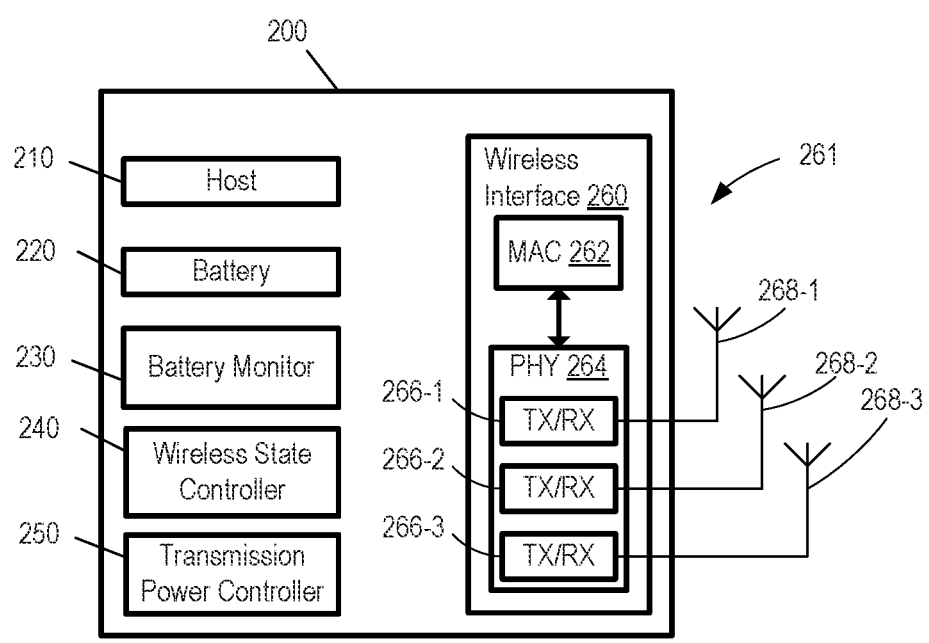
FIG. 2 shows a diagram of an example wireless communication device having a wireless interface, according to an example embodiment.

FIG. 2 shows a diagram of an example wireless communication device 200 having a wireless interface 260, according to an example embodiment. The wireless communication device 200 generally corresponds to the wireless communication device 110 and includes a battery 220, a battery monitor 230, a wireless state controller 240, a transmission power controller 250, and one or more wireless interfaces 260 (analogous to the battery 120, the battery monitor 130, the wireless state controller 140, the transmission power controller 150, and the wireless interface 160, respectively).

The wireless communication device 200 also includes a host processor 210 coupled to the battery monitor 230, the wireless state controller 240, the transmission power controller, and the wireless interface 260. In an embodiment, the host processor 210 is configured to execute machine readable instructions stored in a memory device (not shown) such as a random access memory (RAM), a read-only memory (ROM), a flash memory, etc. The host processor 210 may execute the instructions for one or more of an operating system, program modules, and/or applications. In some embodiments, one or more of the battery monitor 230, the wireless state controller 240, and the transmission power controller 250 are implemented as applications, program modules, and/or operating system modules that are stored in a memory and executed by the host processor 210.

The wireless interface 260 includes a "radio stack" 261, for example, one or more medium access control (MAC) processors 262 (sometimes referred to herein as "the MAC processor 126" for brevity) and one or more physical layer (PHY) processors 264 (sometimes referred to herein as "the PHY processor 130" for brevity). In some embodiments, the radio stack 261 includes additional, higher level layers (not shown), such as a network layer, transport layer, session layer, presentation layer, and/or application layer. In some embodiments, the wireless interface 260 includes two or more instances of at least some portions of the radio stack 261. For example, the wireless interface 260 may include multiple transceivers, multiple MAC processors, etc. In some scenarios, the wireless interface 260 is configured to disable one or more instances of the radio stack 261, for example, when an antenna associated with the radio stack 261 (e.g., transceiver 266-3 and antenna 268-3) are disabled to reduce power consumption.

The PHY processor 264 includes a plurality of transceivers 266, and the transceivers 266 are coupled to a plurality of antennas 268. Although three transceivers 266 and three antennas 268 are illustrated in FIG. 2, the wireless communication device 200 includes other suitable numbers (e.g., 1, 2, 4, 5, etc.) of transceivers 266 and antennas 268 in other embodiments. In some embodiments, the wireless communication device 200 includes a higher number of antennas 268 than transceivers 266, and antenna switching techniques are utilized. In some embodiments, one or more of the transceivers 266 and/or antennas 268 are shared among different instances of the wireless interfaces, for example, antennas may be shared among a Wi-Fi interface and a Bluetooth interface.

In various embodiments, the wireless communication device 200 is configured to provide service for a Wi-Fi communication session (e.g., wireless local area network or ad-hoc network), a Bluetooth communication session, a Wi-Fi Direct communication session, and/or a cellular communication session using the wireless interface 260 (or multiple instances of the wireless interface 260).

The wireless interface 260 is configured to generate and transmit different PHY protocol data units (PPDUs), in various embodiments and/or scenarios. In some embodiments, the wireless interface 260 transmits different PPDUs concurrently using different antennas, for example, using a multiple input multiple output (MIMO) technique.

In various embodiments, the MAC processor 262 and/or the PHY processor 264 are configured to generate data units, and process received data units, that conform to a supported communication protocol (e.g., Wi-Fi, Bluetooth, 4G/5G). Processing may include modulating, filtering, generating digital baseband signals, converting the digital baseband signals to analog baseband signals, and upconverting the analog baseband signals to radio frequency (RF) signals for transmission via the antennas 268. Processing may further include down-converting received RF signals to analog baseband signals, converting the analog baseband signals to digital baseband signals, demodulating, and filtering to generate a PPDU.

The PHY processor 264 includes amplifiers (e.g., a low noise amplifier (LNA), a power amplifier, etc.), an RF downconverter, an RF upconverter, a plurality of filters, analog-to-digital converters (ADCs), digital-to-analog converters (DACs), discrete Fourier transform (DFT) calculators (e.g., a fast Fourier transform (FFT) calculator), inverse discrete Fourier transform (IDFT) calculators (e.g., an inverse fast Fourier transform (IFFT) calculator), modulators, demodulators, etc.

Figure 3:
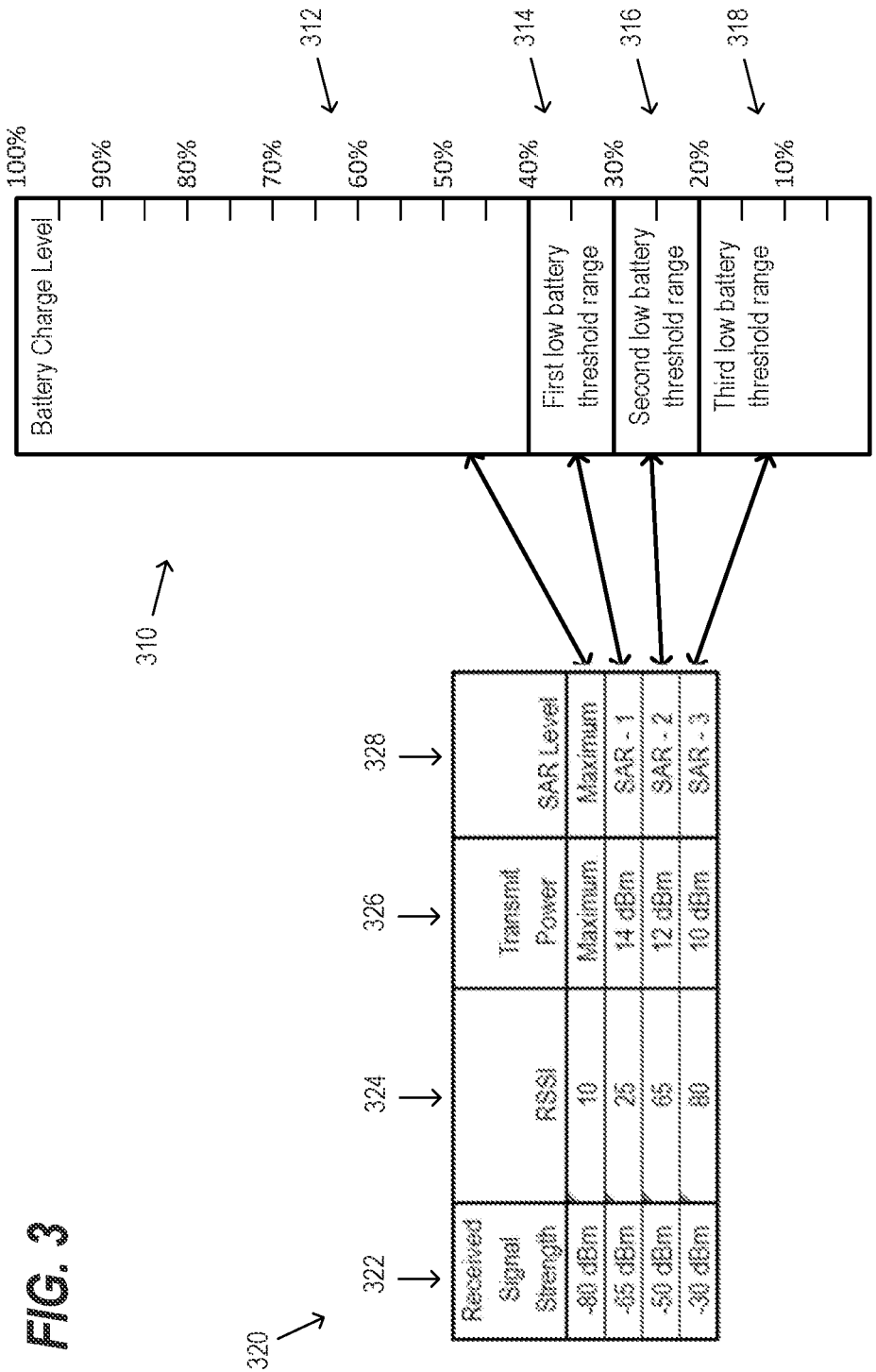
FIG. 3 shows a diagram of example battery threshold ranges and corresponding power saving thresholds for a wireless communication device, according to an embodiment.

FIG. 3 shows a diagram of example battery threshold ranges 310 and corresponding power saving thresholds 320 for a wireless communication device, according to an embodiment. The battery threshold ranges 310 correspond to power saving thresholds 320 to be utilized for taking power saving actions based on a current charge level of a battery as estimated by the battery monitor 130. The battery threshold ranges 310 include a high power level range 312 (from 40% to 100%), a first low battery threshold range 314 (from 30% to 40%), a second low battery threshold range 316 (from 20% to 30%), and a third low battery threshold range 318 (from 0% to 20%). Although the battery threshold ranges 310 are described using a percentage of a full charge of the battery 220, other ranges may be utilized, such as a power scale (e.g., 0.0 to 10.0), a charge capacity (e.g., 2600 milliamp hours out of 3200 milliamp hours), or other suitable indication of charge level ranges. Additionally, there may be one, two, three, four, or more low battery threshold ranges in other embodiments. In some embodiments, different battery threshold ranges 310 are utilized for power saving actions on different instances of the wireless interface 260.

In some embodiments, based at least in part on the charge level of the battery 220 being within the first low battery threshold range 314, a wireless state controller, such as the wireless state controller 140 or 240, monitors a wireless signal strength associated with a wireless communication session (e.g., between the wireless communication device 110 and one of the Wi-Fi access point 172, the cellular base station 174, the paired device 176, and the peer station 178). In some embodiments, the wireless state controller 240 begins monitoring the wireless signal strength immediately upon the charge level of the battery reaching the first low battery threshold range 314 or immediately upon receiving a corresponding notification from the battery monitor 230 (e.g., when the charge level drops from 41% to 40%). In other embodiments, there may be a delay before the wireless state controller 240 responds to a change in the charge level. For example, the wireless state controller 240 may be configured to be idle or "asleep" for an inactivity period (e.g., two seconds, 30 seconds, 2 minutes, or other suitable period), then wake and determine whether the charge level has reached the first low battery threshold 314. In this case, the wireless state controller 240 may wake from an inactivity period and determine that the charge level has already dropped to 38%.

In some embodiments, the wireless signal strength is a transmission power level 326, a specific absorption rate (SAR) level 328, or other suitable indicator of a transmission power level. In other embodiments, the wireless signal strength is a received signal strength 322, a received signal strength indicator (RSSI) 324, a signal to noise ratio (SNR), a signal to interference plus noise ratio (SINR), or other suitable indicator of received signal strength. Although receive signal strengths are not directly related to power consumption used for wireless transmissions, a strong RSSI value or similar received signal strength generally indicates that a radio channel has few obstructions in a forward direction (e.g., from base station 174 to wireless communication device 110), which often indicates that a lower transmission power may be used when transmitting in a reverse direction (e.g., from wireless communication device 110 to base station 174).

Based at least in part on the wireless signal strength reaching a first power saving threshold that is above a minimum connection threshold for maintaining the wireless communication session, the wireless state controller 240 performs a power saving action, such as reducing a transmission power level. Notably, for some thresholds, the wireless communication session may be terminated before a usual end of the wireless communication session, even though the wireless signal strength is above the minimum connection threshold. In other words, but for a low battery charge level that causes the power saving action to be performed by the wireless state controller 240, the wireless communication session would have been maintained and utilized by the wireless communication device 200 for data communications. The minimum connection threshold may be a transmit power of 10 dBm, a received signal strength of −80 dBm, an RSSI of 10 or less, or another suitable value that allows for the communication session to be maintained.

In some embodiments, based at least in part on the charge level of the battery 220 being within the first low battery threshold range 314, a transmission power controller, such as the transmission power controller 150 or 250, monitors the wireless signal strength associated with the wireless communication session. Based at least in part on the wireless signal strength reaching the first power saving threshold that is above a minimum connection threshold for maintaining the wireless communication session, the wireless state controller 240 performs a power saving action, such as reducing a maximum transmission power of the wireless interface 260.

As shown in FIG. 3, the battery threshold ranges 310 each correspond to a value of a power saving threshold 320. These ranges and values form threshold pairs, for example, using the received signal strength 322, −80 dBm and the high power level range 312 as a first threshold pair, −65 dBm and the first low battery threshold range 314 as a second threshold pair, −50 dBm and the second low battery threshold range 316 as a third threshold pair, and −30 dBm and the third low battery threshold range 318 as a fourth threshold pair. Similar threshold pairs are shown for the RSSI 324, transmission power level 326, and SAR level 328. In some embodiments, each of the plurality of threshold pairs corresponds to a different power saving action and the power saving actions may be more aggressive as the corresponding power saving threshold approaches lower levels. In some embodiments, the plurality of threshold pairs includes a threshold pair that corresponds to a power saving action associated with a wireless interface that does not support the wireless communication session. In other words, a low signal strength associated with an active Wi-Fi communication session may result in a power saving action being performed on a Bluetooth wireless interface, allowing an active session to continue while still reducing power consumption.

As one example, based at least in part on the charge level of the battery being 35% (first low battery threshold range 314) and a current power saving threshold (e.g., received signal strength 322) is −60 dBm (above the −65 dBm threshold of received signal strength 322), the wireless state controller 240 does not perform a power saving action. When the current power saving threshold reaches −65 dBm, the wireless state controller 240 performs one or more power saving actions, described below. As another example, based at least in part on the charge level of the battery being 15% (third low battery threshold range 318) and a current RSSI value is 75, the wireless state controller 240 performs a power saving action.

Generally, a power saving action may result in reduced transmission speeds and/or reduced functionality as a tradeoff for increased battery life. For example, disabling an antenna may reduce wireless data throughput by precluding the use of MIMO transmissions, but battery life may be extended by a corresponding reduction in power consumption by the disabled antenna. By using several thresholds, the wireless communication device 200 may gradually perform additional power saving actions or increase an effect of existing power saving actions as the thresholds are successively reached, thereby delaying or reducing a perceived impact on a user's experience using the wireless communication device 200. For example, the wireless communication device 200 may reduce a Wi-Fi transmission speed (e.g., from 4 Mbps to 2 Mbps by disabling a radio stack or antenna) while still allowing Wi-Fi transmissions to take place during the second low battery threshold range 316, then disable Wi-Fi transmissions altogether during the third low battery threshold range 318, as opposed to simply disabling Wi-Fi and inconveniencing a user when a single threshold has been met.

As shown in FIG. 3, when the power saving thresholds 320 correspond to a received signal strength (received signal strength 322 and RSSI 324), the power saving thresholds 320 are inversely related to corresponding battery thresholds. In other words, as the charge level of the battery is further reduced, higher levels of received signal strength are needed to prevent a power saving action from being performed. However, when the power saving thresholds correspond to a transmit signal strength (transmission power level 326 and SAR level 328), the power saving thresholds 320 are directly related to the corresponding battery thresholds. In other words, as the charge level of the battery is further reduced, lower levels of transmission power are available to be used. Accordingly, at lower battery charge levels, more electrical power is saved by further reducing transmission power or by more aggressively terminating wireless communication sessions. Generally, power consumption is more closely related to transmit signal strength than received signal strength, so the wireless communication device 200 is configured to use thresholds corresponding to transmit power 326 or SAR level 328. However, in some scenarios, an RSSI value or other receive signal strength may be more readily available than a transmit signal strength and the wireless communication device 200 utilizes the RSSI value instead of the transmit signal strength.

In various embodiments, the wireless state controller 240 and/or the transmission power controller 250 may perform a variety of power saving actions. In an embodiment, the transmission power controller 250 reduces a transmission power to a SAR level that corresponds to a current charge level of the battery. Although SAR levels are generally used for reducing electromagnetic radiation exposure to a user of a wireless device, these SAR levels may be utilized by the transmission power controller 250 to reduce power consumption of the wireless communication device 200. For example, a maximum SAR level may correspond to the wireless communication device 200 being set down away from the user, allowing for a maximum transmission power, a SAR-1 level may correspond to the wireless communication device 200 being located in a user's hand, a SAR-2 level may correspond to the wireless communication device 200 being located in the user's pocket, and a SAR-3 level may correspond to the wireless communication device 200 being located next to the user's ear. As the risk of injury due to electromagnetic radiation increases with proximity to sensitive areas of the user, the SAR level and thus the transmission power level is reduced.

As discussed above, one power saving action that may be performed is terminating a wireless communication session. In an embodiment, when the wireless communication session is between the wireless communication device 200 and an access point (e.g., Wi-Fi access point 172), the wireless state controller 240 may cause the wireless interface 260 to terminate the wireless communication session by disassociating from the access point. In other words, the wireless state controller 240 causes a "graceful" disconnection from the AP, which may allow for packet acknowledgments to be sent and/or received before the disconnection. Moreover, the wireless state controller 240 may disable further searching for alternative access points with which to associate, reducing power consumption associated with the wireless interface 260.

Another power saving action is halting wireless scan operations for neighbor communication devices (e.g., Wi-Fi access point 172, cellular base station 174) based at least in part on the charge level of the battery being outside a scanning threshold range. The scanning threshold range may include the high power level range 312 but omit the low battery threshold ranges 314, 316, and 318, for example. The scanning threshold range may include the high power level range 312 and the first low battery threshold range 314, but omit the second and third low battery threshold ranges 316 and 318, as another example.

Yet another power saving action is disabling at least one radio stack 261 or antenna 268 based at least in part on the charge level of the battery being outside of a multiple input multiple output (MIMO) threshold range. The MIMO threshold range may include the high power level range 312 but omit the low battery threshold ranges 314, 316, and 318, for example. In other words, the wireless communication device 200 may use only one radio stack or antenna instead of multiple radio stacks or antennas for MIMO communications.

Another power saving action is reducing a Bluetooth idle time for a paired Bluetooth device based at least in part on the charge level of the battery being outside a Bluetooth threshold range. The Bluetooth threshold range may include the high power level range 312 but omit the low battery threshold ranges 314, 316, and 318, for example. In this scenario, the wireless state controller 240 automatically disconnects the paired Bluetooth device after a wireless communication session with the paired Bluetooth device is idle for a period of time corresponding to the reduced Bluetooth idle time. In other words, if the charge level is within the Bluetooth threshold range (e.g., 75%), the idle time may be two minutes, but if the charge level is outside the Bluetooth threshold range (e.g., 18%), the idle time may be 30 seconds. In some embodiments, searches for new Bluetooth devices are disabled after the paired Bluetooth device is disconnected.

Yet another power saving action is reducing a frequency of regularly scheduled background scans. In an embodiment, for example, the wireless state controller 240 may increase a separation between target wake times for a Wi-Fi communication session.

Another power saving action is changing a connection state of a wireless communication session to an idle state or standby state that allows only high importance data transfers.

When the wireless communication device 200 provides a mobile hotspot functionality, one power saving action is to monitor respective wireless signal strengths and respective antenna utilizations for a plurality of mobile hotspot connected devices. In an embodiment, the wireless state controller 240 selects and disconnects one of the mobile hotspot connected devices having a highest antenna utilization. Another power saving action is to monitor respective connection durations for the mobile hotspot connected devices and select and disconnect one of the mobile hotspot connected devices having a longest connection duration.

Roaming functionality for Wi-Fi and cellular communication sessions may cause increased power consumption as a received signal strength is reduced. In some embodiments, the power saving action includes disabling the roaming functionality of a radio stack. In one such embodiment, the roaming functionality is disabled based at least in part on the charge level of the battery being within the low battery threshold range and the wireless communication device 200 is located in proximity to a predetermined location having no handover wireless communication devices to maintain a wireless communication session. The predetermined location may be a home location of a user of the wireless communication device 200. For example, when a user is near their home, they may wish to disable Wi-Fi roaming so that the wireless communication device 200 does not attempt to find other access points where they are unlikely to be found (e.g., when neighbor access points are likely to be owned by other households and secured from unauthorized use by the user).

In some embodiments, the power saving action includes switching to a more power efficient radio access technology. For example, the wireless state controller 240 may cause the wireless communication device 200 to switch from a Wi-Fi communication session to a cellular communication session, or from a cellular communication session to a femtocell communication session.

In another embodiment, the power saving action is a request for a more efficient sub-channel on which a wireless communication session is operated. For example, the wireless state controller 240 may cause the wireless communication device 200 to request a Wi-Fi channel or sub-channel having a lower frequency range (e.g., 2.4 GHz instead of 5 GHz) that improves range and reduces power consumption.

Figure 4:
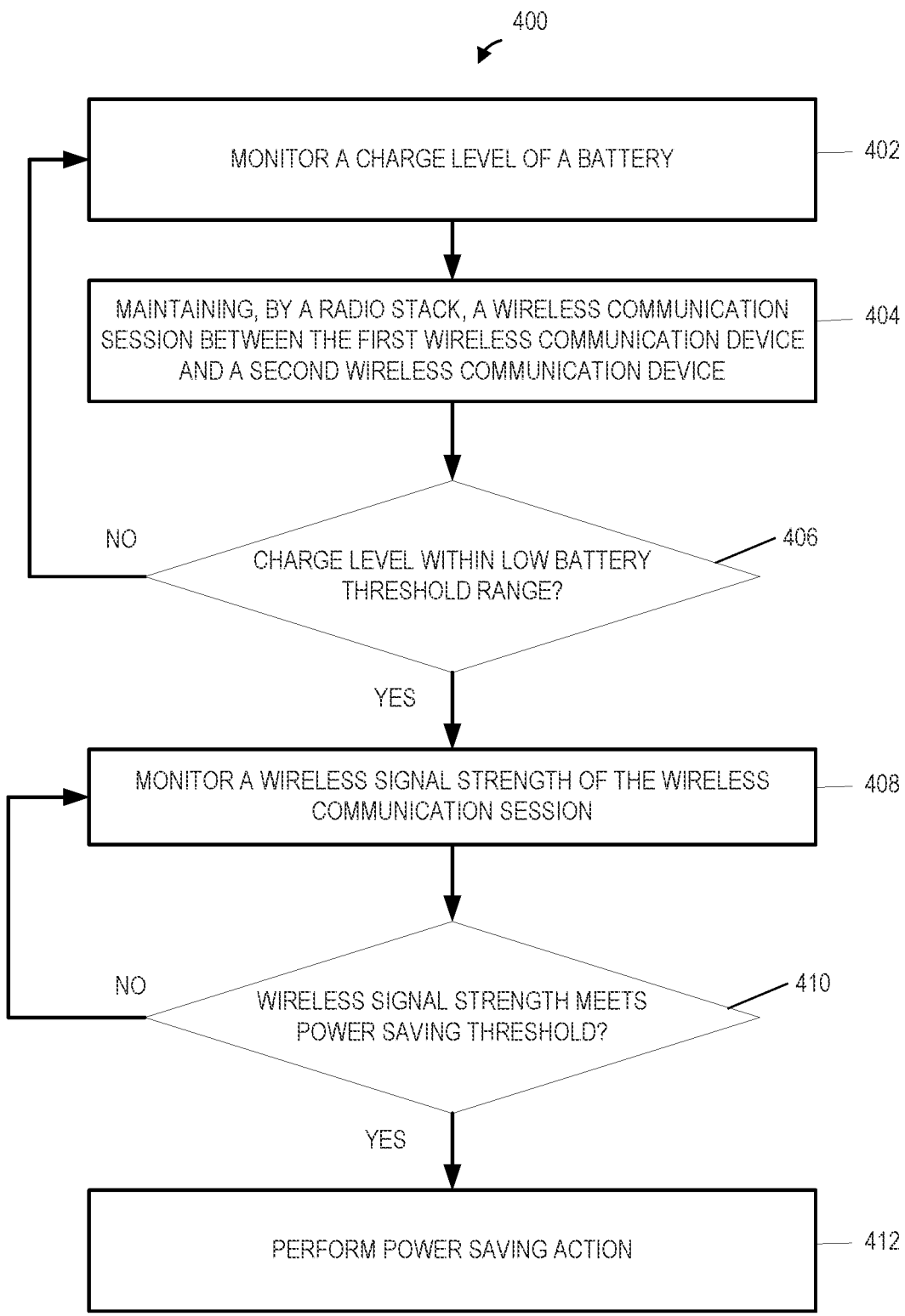
FIG. 4 shows a flowchart of an example method of reducing power consumption of a first wireless communication device, according to an example embodiment.

FIG. 4 shows a flowchart of an example method 400 of reducing power consumption of a first wireless communication device, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 4. Steps may be performed serially, in a partially overlapping manner, or fully in parallel. Thus, the order in which steps of method 400 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the wireless communication device 110 (e.g., via the battery monitor 130, the wireless state controller 140, and/or the transmission power controller 150), the wireless communication device 200 (e.g., via the host processor 210, the battery monitor 230, the wireless state controller 240, and/or the transmission power controller 250), or other suitable wireless communication device.

Method 400 begins with step 402. At step 402, a charge level of a battery associated with the first wireless communication device is monitored. For example, the battery monitor 230 may monitor the charge level of the battery 220.

At step 404, a wireless communication session between the first wireless communication device and a second wireless communication device is maintained. For example, a Wi-Fi communication session between the wireless communication device 110 and the Wi-Fi access point 172, or a Bluetooth communication session between the wireless communication device 110 and the paired device 176 is maintained (i.e., kept active and available for sending and receiving data).

At step 406, it is determined whether the charge level of the battery is within a low battery threshold range (e.g., the first low battery threshold range 314, the second low battery threshold range 316, etc.). Based at least in part on the charge level of the battery being within the first low battery threshold range, the method 400 advances to step 408. Otherwise, the method returns to step 402.

At step 408, a wireless signal strength associated with the wireless communication session is monitored. For example, the wireless state controller 240 monitors one or more of a received signal strength, an RSSI 324, and/or a transmit power for the wireless communication session.

At step 410, it is determined whether the wireless signal strength meets the power saving threshold. For example, the wireless state controller 240 determines whether the received signal strength is less than the power saving threshold for the received signal strength 322, whether the RSSI is less than the power saving threshold for the RSSI 324, and/or whether the transmit power is greater than the power saving threshold for the transmission power level 326. Based at least in part on the wireless signal strength reaching a first power saving threshold that is above a minimum connection threshold for maintaining the wireless communication session, the method 400 advances to step 412. Otherwise, the method returns to step 408.

At step 412, the wireless state controller 240 performs a power saving action associated with a wireless interface that supports the wireless communication session, in various embodiments. In an embodiment, the wireless communication session to the second wireless communication device is terminated. In other embodiments, the wireless state controller 240 performs a different power saving action, as described above.

Figure 5:
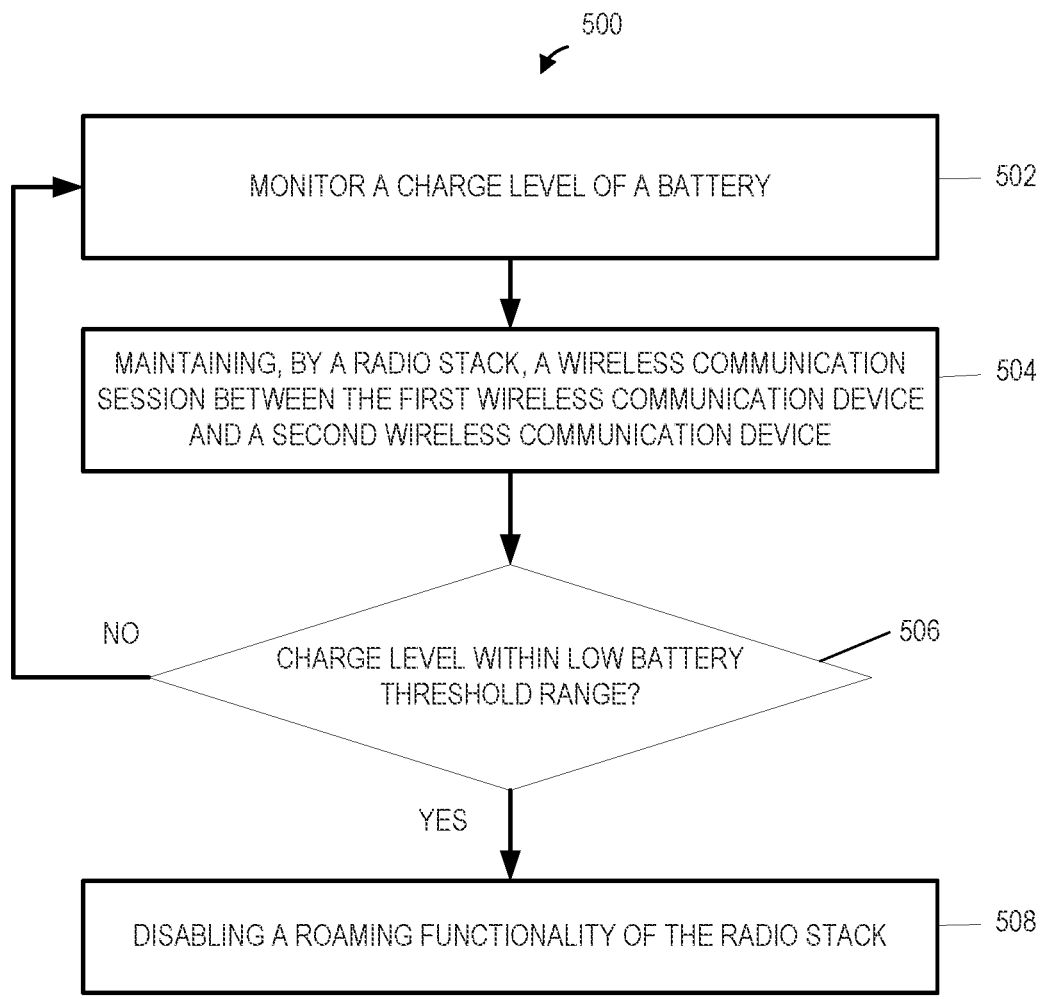
FIG. 5 shows a flowchart of another example method of reducing power consumption of a first wireless communication device, according to an example embodiment.

FIG. 5 shows a flowchart of an example method 500 of reducing power consumption of a first wireless communication device, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the wireless communication device 110 (e.g., via the battery monitor 130, the wireless state controller 140, and/or the transmission power controller 150), the wireless communication device 200 (e.g., via the host processor 210, the battery monitor 230, the wireless state controller 240, and/or the transmission power controller 250), or other suitable wireless communication device.

Method 500 begins with step 502. At step 502, a charge level of a battery associated with the first wireless communication device is monitored. For example, the battery monitor 230 may monitor the charge level of the battery 220.

At step 504, a wireless communication session between the first wireless communication device and a second wireless communication device is maintained by a radio stack of the first wireless communication device. For example, a Wi-Fi communication session between the wireless communication device 110 and the Wi-Fi access point 172, or a Bluetooth communication session between the wireless communication device 110 and the paired device 176 is maintained by the radio stack 261.

At step 506, it is determined whether the charge level of the battery is within a low battery threshold range (e.g., the first low battery threshold range 314, the second low battery threshold range 316, etc.). Based at least in part on the charge level of the battery being within the first low battery threshold range, the method 500 advances to step 508. Otherwise, the method returns to step 502.

At step 508, a roaming functionality of the radio stack is disabled. In an embodiment, disabling the roaming functionality includes disabling active scans for candidate access points, for example, other instances of the Wi-Fi access point 172.

Figure 6:
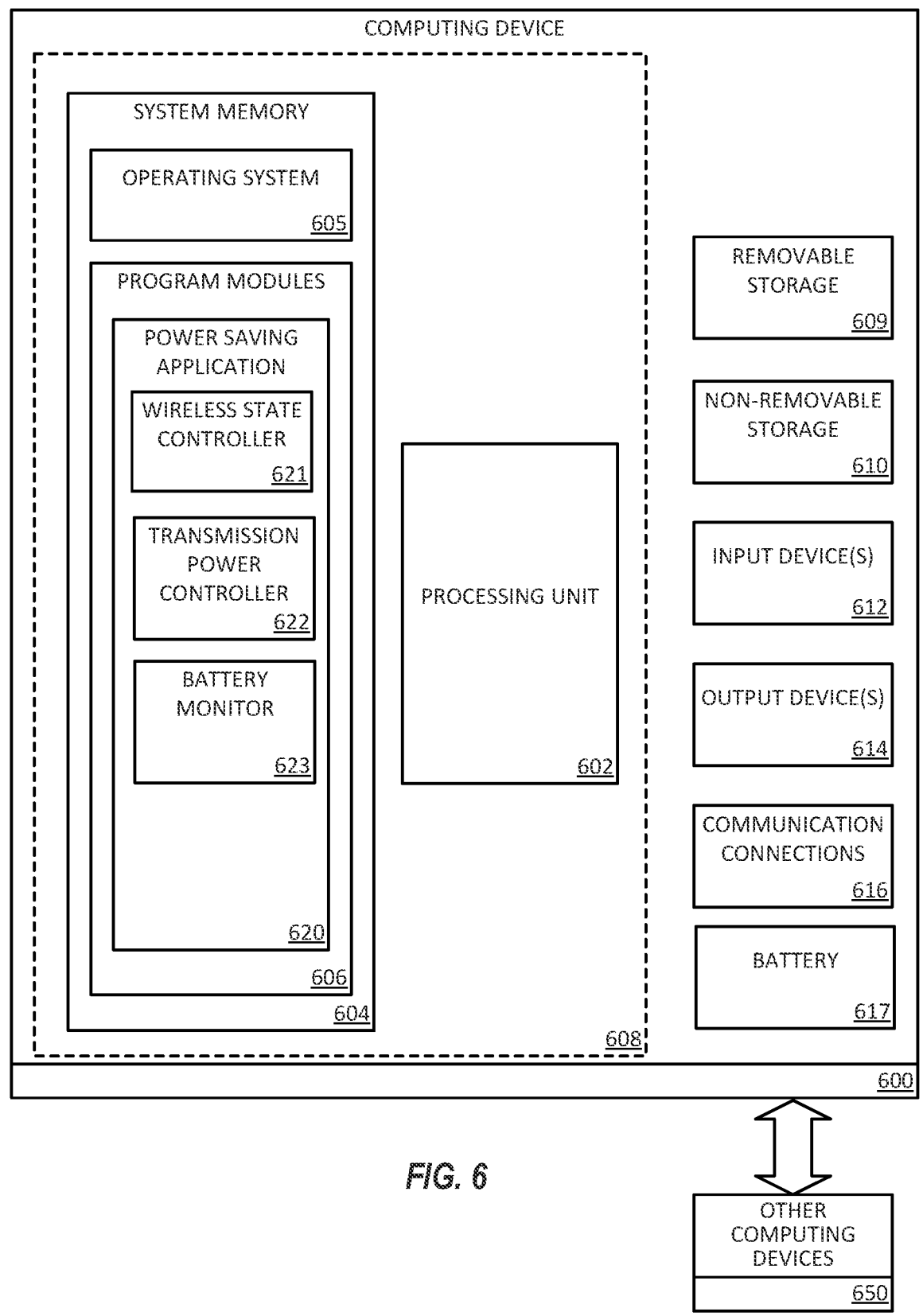
FIG. 6 is a block diagram illustrating example physical components of a computing device with which aspects of the disclosure may be practiced.
Figure 7A:
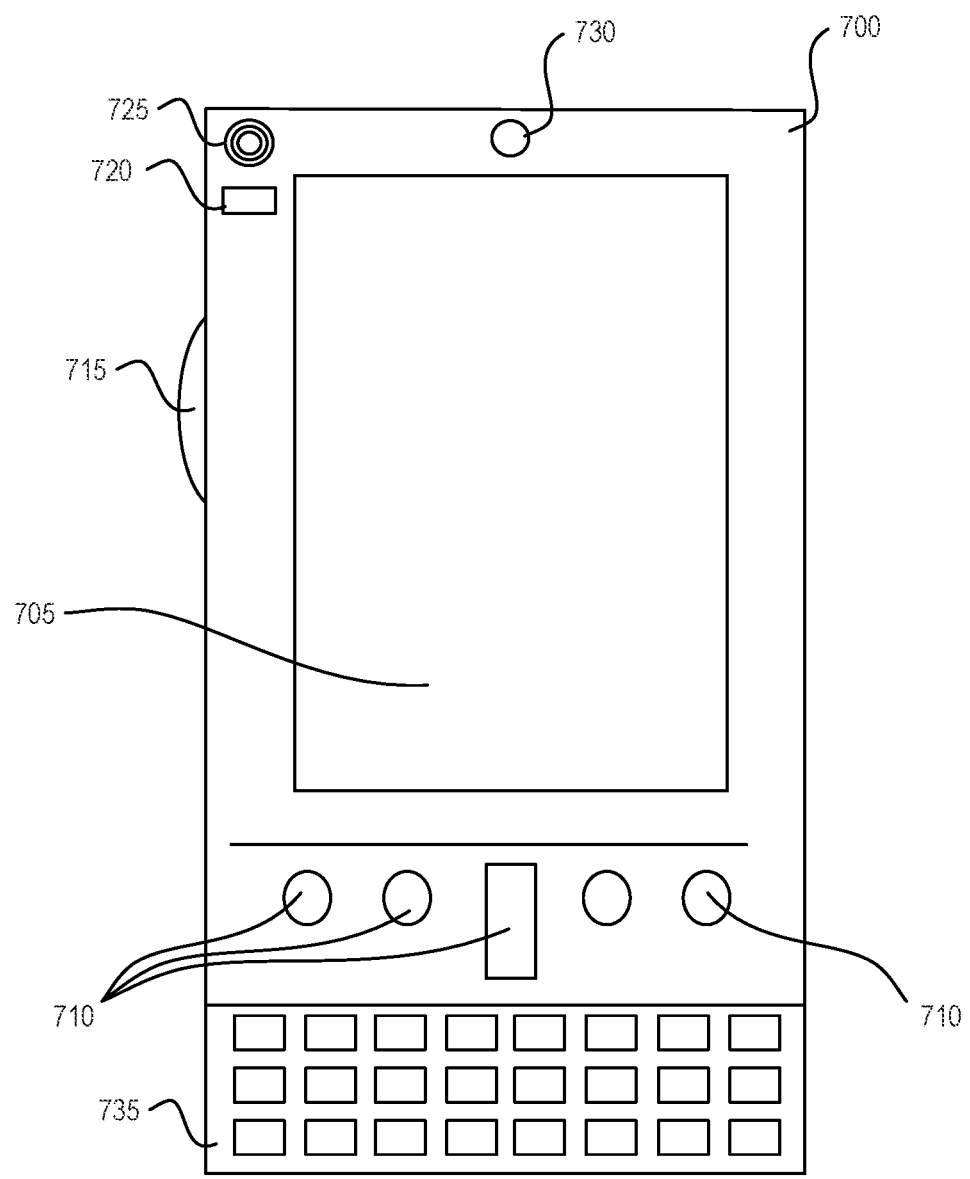
FIGS. 7A and 7B are simplified block diagrams of a mobile computing device with which aspects of the present disclosure may be practiced.
Figure 7B:
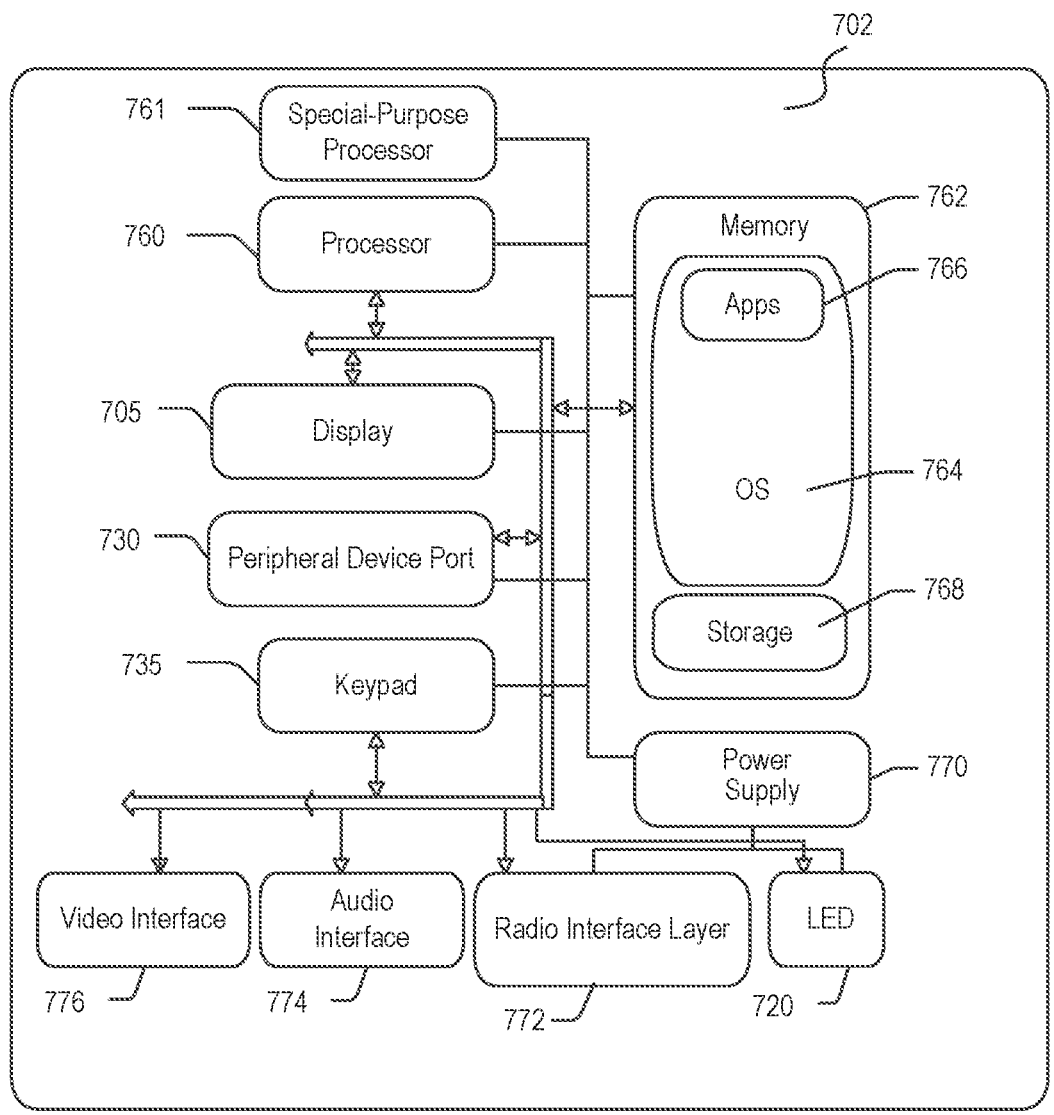

FIGS. 6, 7A, and 7B and the associated descriptions provide a discussion of a variety of operating environments in which aspects of the disclosure may be practiced. However, the devices and systems illustrated and discussed with respect to FIGS. 6, 7A, and 7BB are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer executable instructions for implementing a power saving application 620 on a computing device (e.g., wireless communication device 110, wireless communication device 200), including computer executable instructions for power saving application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running power saving application 620, such as one or more components with regard to FIGS. 1-2 and, in particular, wireless state controller 621 (e.g., corresponding to wireless state controller 140 and/or 240), transmission power controller 622 (e.g., corresponding to transmission power controller 150 and/or 250), and/or battery monitor 623 (e.g. corresponding to battery monitor 130 and/or 230).

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., power saving application 620) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports. The computing device 600 may also include a battery 617, similar to the battery 120 and/or 220.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for allocating traffic to communication links (e.g., offline routing engine, online routing engine, etc.).

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/ information transfer and storage means, including electronic mail and collaborative data/information sharing systems.

As should be appreciated, FIGS. 7A and 7B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of reducing power consumption of a first wireless communication device, the method comprising:
    monitoring a battery charge level of a battery associated with the first wireless communication device during an active wireless communication session between the first wireless communication device and a second wireless communication device;
    determining whether the battery charge level of the battery associated with the first wireless communication device is within a first low battery threshold range of a first threshold pair of a plurality of threshold pairs, and each of the plurality of threshold pairs corresponds to a different power saving action;
    maintaining the active wireless communication session after determining the battery charge level being within the first low battery threshold range; and
    performing a power saving action associated with a wireless interface that supports the active wireless communication session while maintaining the active wireless communication session.

2. The method of claim 1, wherein performing the power saving action comprises performing a power saving action corresponding to a current threshold pair of the plurality of threshold pairs that corresponds to a current charge level of the battery.

3. The method of claim 1, wherein the power saving action includes halting wireless scan operations for neighbor communication devices by the first wireless communication device based at least in part on the charge level of the battery being outside a scanning threshold range.

4. The method of claim 1, wherein the power saving action includes disabling at least one radio stack of a plurality of radio stacks of the first wireless communication device based at least in part on the charge level of the battery being outside of a multiple input multiple output (MIMO) threshold range.

5. The method of claim 1, wherein:
    the second wireless communication device is an access point; and
    the power saving action includes terminating the active wireless communication session by disassociating from the access point.

6. The method of claim 1, wherein the plurality of threshold pairs includes a threshold pair that corresponds to a power saving action associated with a wireless interface that does not support the active wireless communication session.

7. The method of claim 6, wherein the second wireless communication device is a paired Bluetooth device and the power saving action includes:
    reducing a Bluetooth idle time for the paired Bluetooth device based at least in part on the charge level of the battery being outside a Bluetooth threshold range; and
    automatically disconnecting the paired Bluetooth device after the active wireless communication session is idle for a period of time corresponding to the reduced Bluetooth idle time.

8. The method of claim 1, wherein the active wireless communication session is a Wi-Fi direct communication session.

9. The method of claim 1, wherein the active wireless communication session is a mobile hotspot session served by the first wireless communication device and the second wireless communication device is a mobile hotspot connected device.

10. The method of claim 9, further comprising:
    monitoring respective wireless signal strengths and respective radio stack utilizations for a plurality of mobile hotspot connected devices;
    selecting one of the plurality of mobile hotspot connected devices having a highest radio stack utilization as the second wireless communication device;
    wherein the power saving action includes terminating the active wireless communication session.

11. The method of claim 10, further comprising:
    monitoring respective wireless signal strengths and respective connection durations for a plurality of mobile hotspot connected devices;
    selecting one of the plurality of mobile hotspot connected devices having a longest connection duration as the second wireless communication device;
    wherein the power saving action includes terminating the active wireless communication session.

12. The method of claim 1, further comprising:
    determining the wireless signal strength reaching a power saving threshold above a connection threshold for maintaining the wireless communication session.

13. A method of reducing power consumption of a first wireless communication device, the method comprising:
    monitoring a battery charge level of a battery associated with the first wireless communication device during an active wireless communication session between the first wireless communication device and a second wireless communication device;
    determining whether the battery charge level of the battery associated with the first wireless communication device is within a first low battery threshold range of a first threshold pair of a plurality of threshold pairs, and each of the plurality of threshold pairs corresponds to a different power saving action;
    maintaining the active wireless communication session after determining the battery charge level being within the first low battery threshold range; and
    disabling a roaming functionality of the radio stack of the first wireless communication device while maintaining the active wireless communication session.

14. The method of claim 13, wherein disabling the roaming functionality comprises disabling the roaming functionality based at least in part on the charge level of the battery being low and the first wireless communication device is located in proximity to a predetermined location having no handover wireless communication devices to maintain the active wireless communication session.

15. The method of claim 14, wherein the predetermined location is a home location of a user of the first wireless communication device.

16. The method of claim 13, wherein disabling the roaming functionality includes disabling active scans for candidate access points.

17. A first wireless communication device, comprising:
a battery monitor configured to monitor a battery charge level of a battery associated with the first wireless communication device during an active wireless communication session between the first wireless communication device and a second wireless communication device;
a wireless interface having a radio stack configured to establish, maintain, and terminate an active wireless communication session with the second wireless communication device;
a wireless state controller configured to monitor a wireless signal strength associated with the active wireless communication session;
wherein the wireless state controller is configured to cause the wireless interface to perform a power saving action associated with the active wireless communication session while maintaining the active wireless communication session after determining the battery charge level of the battery associated with the first wireless communication device is within a first low battery threshold range of a first threshold pair of a plurality of threshold pairs, and each of the plurality of threshold pairs corresponds to a different power saving action.

18. The first wireless communication device of claim 17, wherein:
the second wireless communication device is a paired Bluetooth device; and
the wireless state controller is configured to i) reduce a Bluetooth idle time for the paired Bluetooth device based at least in part on the charge level of the battery being outside a Bluetooth threshold range, and ii) automatically disconnect the paired Bluetooth device after the active wireless communication session is idle for a period of time corresponding to the reduced Bluetooth idle time.

19. The first wireless communication device of claim 17, wherein:
the active wireless communication session is a mobile hotspot session served by the first wireless communication device and the second wireless communication device is a mobile hotspot connected device;
the wireless state controller is configured to i) monitor respective wireless signal strengths and respective radio stack utilizations for a plurality of mobile hotspot connected devices, and ii) select one of the plurality of mobile hotspot connected devices having a highest radio stack utilization as the second wireless communication device.

* * * * *